Figure 1:
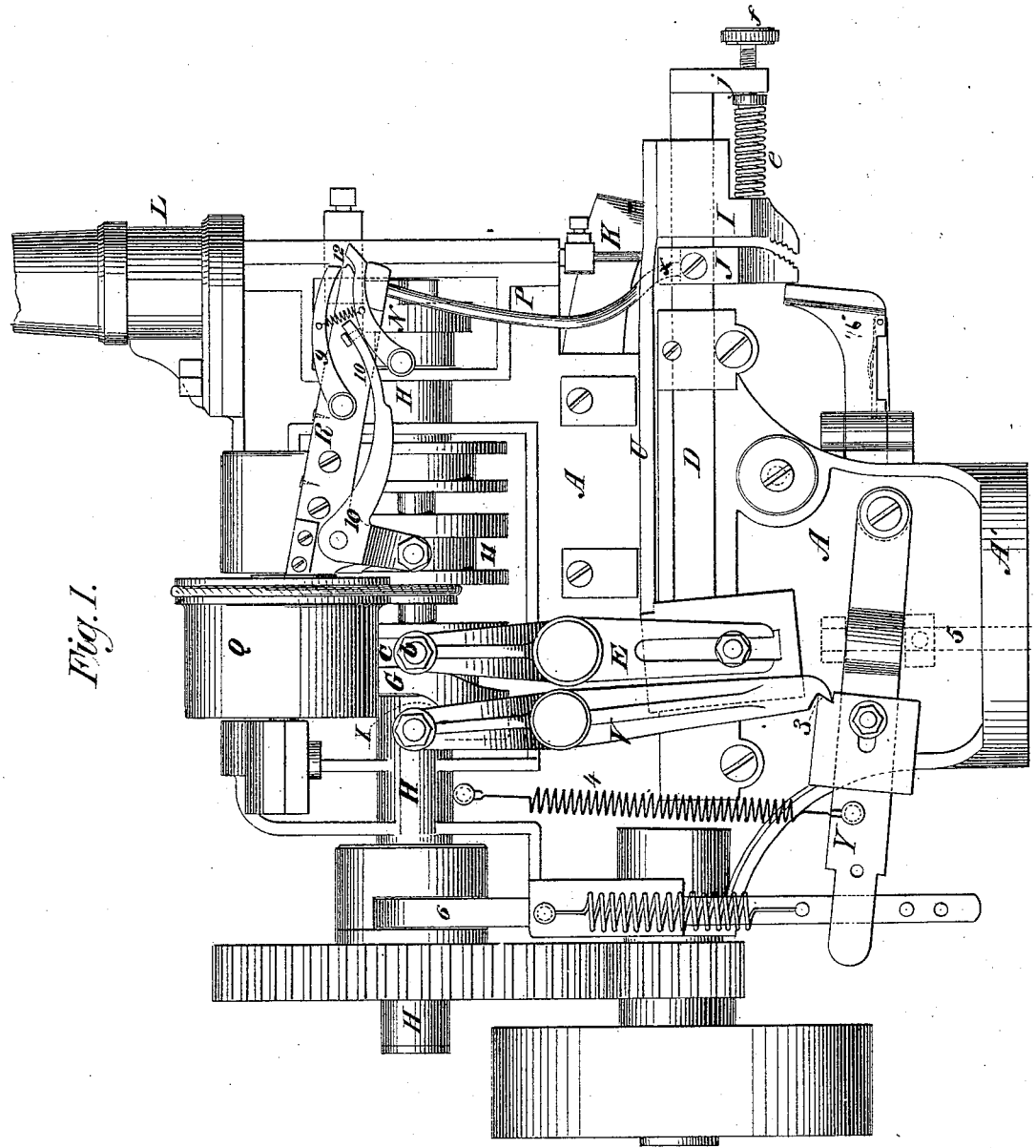

(No Model.)

J. R. SCOTT.

MACHINE FOR LASTING BOOTS AND SHOES.

No. 284,906. Patented Sept. 11, 1883.

WITNESSES:
Gustave Dieterich
James P. Dolan

Jacob R. Scott, INVENTOR
BY J. C. Clayton,
ATTORNEY.

(No Model.)  J. R. SCOTT.  3 Sheets—Sheet 2.
MACHINE FOR LASTING BOOTS AND SHOES.
No. 284,906. Patented Sept. 11, 1883.
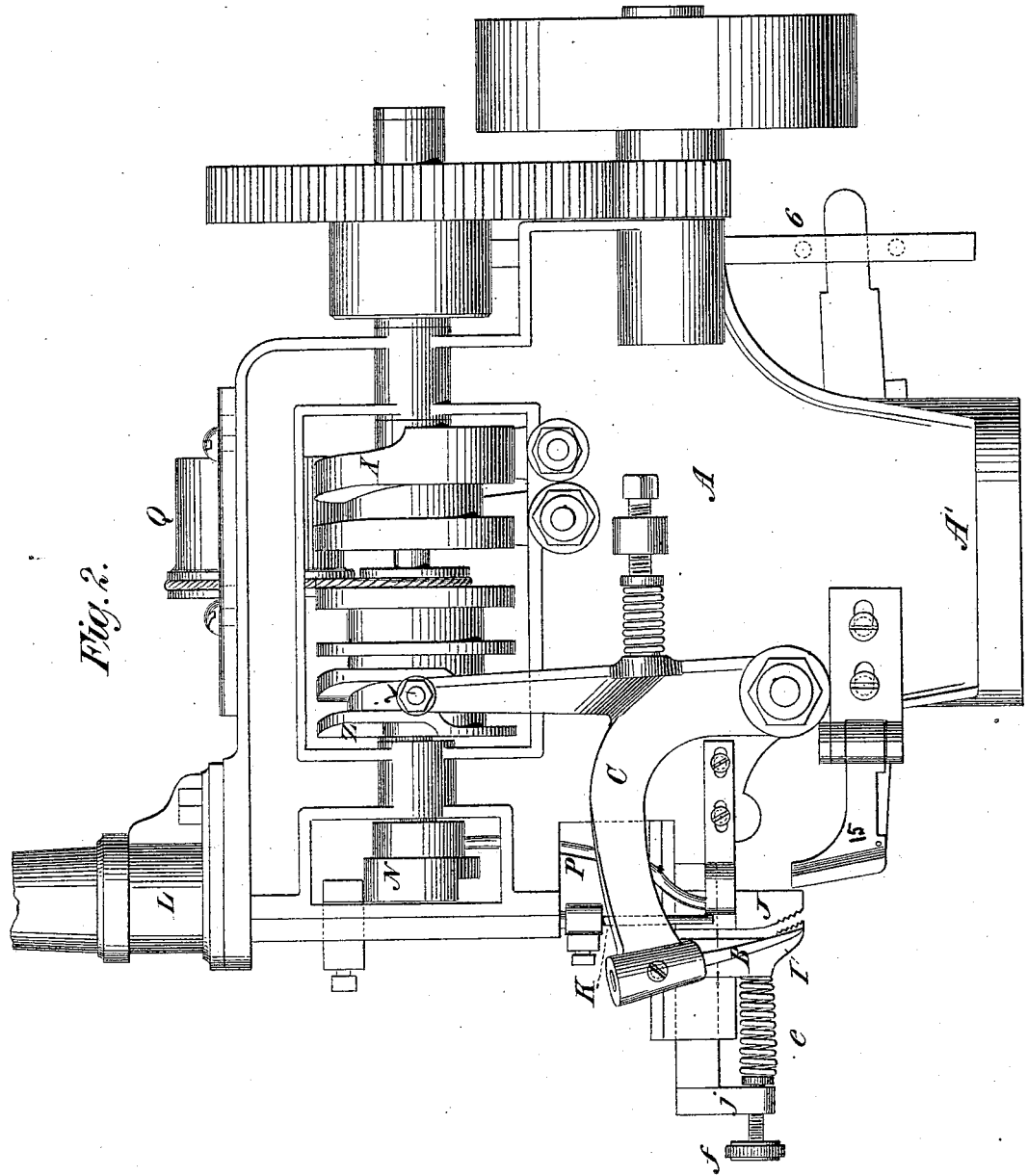
WITNESSES:
Gustave Dieterich
James P. Dolan
Jacob R. Scott, INVENTOR
BY J. C. Clayton,
ATTORNEY (No Model.) J. R. SCOTT. 3 Sheets—Sheet 3.
MACHINE FOR LASTING BOOTS AND SHOES.
No. 284,906. Patented Sept. 11, 1883.
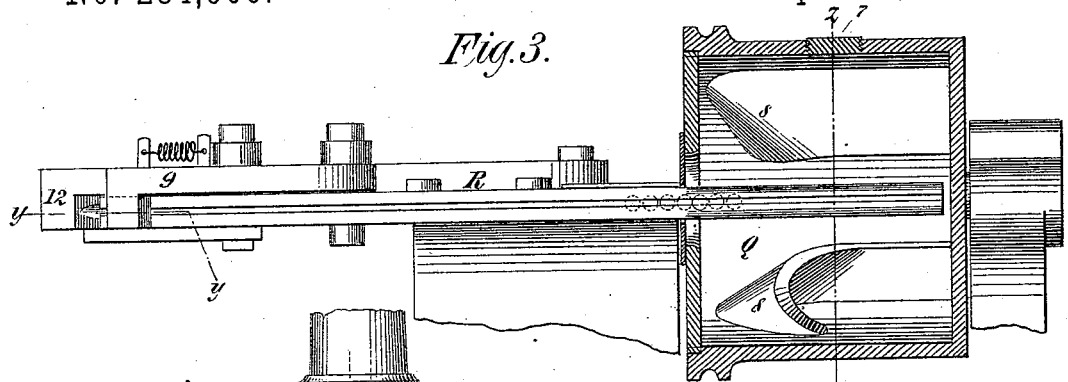
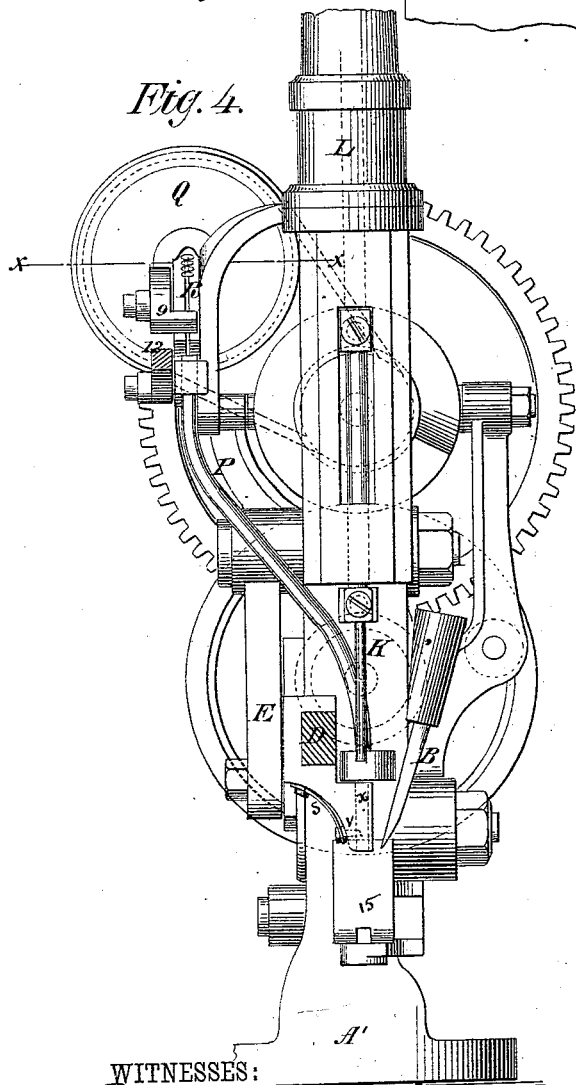
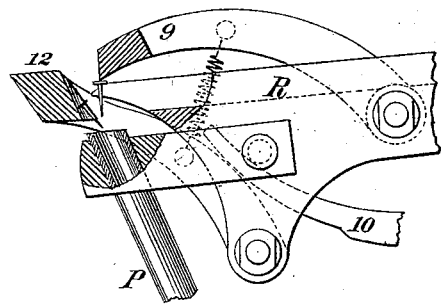
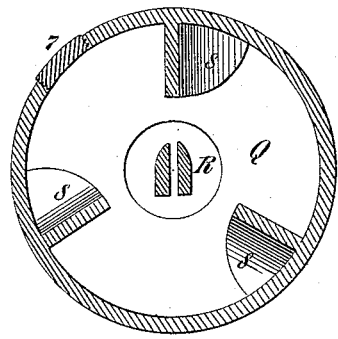
WITNESSES:
Gustave Dieterich
James P. Dolan
Jacob R. Scott, INVENTOR
BY J. C. Clayton.
Attorney.
N. PETERS. Photo-Lithographer, Washington, D. C.

UNITED STATES PATENT OFFICE.

JACOB R. SCOTT, OF NYACK, ASSIGNOR TO JAMES CAVANAGH, TRUSTEE, OF BROOKLYN, NEW YORK.

MACHINE FOR LASTING BOOTS AND SHOES.

SPECIFICATION forming part of Letters Patent No. 284,906, dated September 11, 1883.

Application filed July 14, 1883. (No model.)

*To all whom it may concern:*

Be it known that I, JACOB ROOKHART SCOTT, machinist, a citizen of the United States of America, residing at Nyack, Rockland county, in the State of New York, have invented certain new and useful Improvements in Machinery for Lasting Shoes, of which the following is a specification.

This specification describes a machine which contains several improvements upon the invention for which a patent has lately been allowed me, and which will bear date July 17, 1883, No. 281,306.

My machine consists of a frame or head supporting a mechanism operated by cams, cranks, rods, and springs in such a manner that the gripper-jaws (one of which rests on the inner sole, under the edge of the upper) seize the upper and draw it over the last, and hold it there until the driver drives a tack supplied through the tack-chute. The grippers are then retracted, and are ready to take a new grip and repeat as above. The resistance to the drawing-over action of the grippers is due to the action of a spear or "holdfast" with a sharp, serrated, or roughened end, against which the operator upwardly presses the insole at the instant when the gripper-jaws make a "grip." After a tack is driven the operator feeds the last and insole and upper the proper distance—say one-fourth to three-fourths of an inch—pressing them upwardly against the holdfast, as described. This operation closely resembles that of the hand-last, but is far more rapid.

In the drawings similar characters designate like parts.

Figures 1 and 2 are opposite side elevations. Fig. 3 is a horizontal section through the tack-hopper, and also shows a plan of the raceway. Fig. 4 is a front elevation, facing the operator. Fig. 5 is a magnified detail of the device for single delivery of the tacks. Fig. 6 is a vertical cross-section of the tack-hopper.

A is the cast head or frame of the machine, and may be cast in one piece, the other parts being attached to it in the usual mode.

A' is a pillar, table, or standard upon which the machine rests. The gripper-jaws should stand at a breast height from the floor.

B is the spear or finger or holdfast, and is adjustable in rocking lever C. This spear is perhaps the most important member of my machine. Its downward end is pointed, or serrated or roughened, though I prefer it to be pointed. This construction makes it take a firm hold against the outer surface of the inner sole when the operator presses it up against the spear, at the instant or just before the grippers start to draw the upper over the inner sole and edge of the last. The spear or holdfast B thus steadily holds in a fixed position the last and its inner sole while the upper is being drawn over by the grippers. This holdfast may be used in an arm, C, fixed fast to the frame, being adjustable in frame, as shown in my above-referred-to former application; but I prefer to have it as shown in the drawings, where the arm C is provided with three arms, of which one carries the spear B, another is pivoted to the frame A, while the third receives a rocking motion by its stud $i'$, working in the groove-cam Z. At the instant the tack is driven this cam motion just described rocks lever C so as to lift up the spear B, withdrawing it from the insole, and permitting the operator to slide the shoe along under the spear a proper space for insertion of the next tack. When this rocking motion is not used, the operator has to disengage the insole from the spear by a downward movement of his hands, at some loss of time.

D is a horizontal gripper-bar, which slides in bearings secured to the slide of the frame A. Motion back and forth is given to bar D by the cam-lever E. One end of this lever is secured to bar D by a stud and slot. The other end is arranged to work in the groove of cam G. The center of lever E is pivoted to the frame A by a spur, so as to rock. H is the main shaft, driven by appropriate belts, and carrying all the cams.

I is the outer gripper or jaw, having a curved foot, and is intended while in use to rest upon the outer surface of the insole, close up to and projecting under the upper. This gripper I slides upon the bar D, and is actuated toward the outer gripper by the spiral spring $e$. The force of this spring is regulated by means of the set-screw $f$ and stud $j$. The motion outward of gripper I is obtained through connecting-lever U, the inner end of which is in contact with a screw-stud on the rear side of cam-lever V. The center of lever V is pivoted to frame A, while its upper end has a stud working in the groove of cam X. The lower end of lever V has a tooth or clutch, which catches against a stop on the treadle-lever Y. This lever is pivoted to the frame A, and is held up by spring 4, and depressed by a treadle attached to connecting-rod 5. The outer end of lever Y is connected to a revolving stop-clutch, 6. When the foot is on the treadle, the mechanism acts; removing the foot, the mechanism stops. J is the inner gripper-jaw, which is fast to bar D by means of a set-screw. K is the driver, which plays vertically in the hollow standard L upon top of the frame A. A strong spiral spring is contained in standard L, resting upon the head of the driver K, and held down by a hand-screw on top of the standard L. The downward pressure of this spring upon the driver, when raised by the cam N, gives the blow which drives the tack. Cam N is on the main shaft, and is arranged to raise the driver K.

P is the chute, through which the tacks are fed singly, either by a small boy or by the automatic device hereinafter described.

Q is the tack-hopper, revolving on its own shaft near to main shaft, to the pulley of which it is connected by a belt. This hopper is cylindrical, having several curved flukes or buckets, 8, on its inner surface. (See Figs. 3 and 6.)

R is the tack-raceway, one end projecting into the hopper from end to end, nearly. The outer end of the raceway extends to a point over the mouth of the tack-chute. The tack-hopper is about half filled—say one-half a pound of small lasting-tacks—through a door, 7. As the hopper revolves, its curved flukes lift up the tacks to the highest point and drop them from a point immediately over the groove in the raceway. At each one-third revolution (where three flukes are used) some of the tacks fall point downward, so as to be caught in the grooves of the raceway. Tacks so caught are held by their heads, which slide down the upper surface of the raceway until the last in line is caught and held down by the gate 9.

10 is a rock-lever actuated by cam 11, and pivoted to raceway R.

9 is the stop-gate to stop the tack last in line on the raceway.

12 is an under gate, having its upper end grooved out to catch the last tack when released by gate 9, and then to drop it into mouth of chute P, which delivers it into tack-passage of jaw J. Jaw J has a tack and driver passage, $x$, with a spring, $s$, and pin $v$, to catch the descending tack and hold it at a suitable distance from the work (in the passage $x$) until the driver falls and drives it home.

Gates 9 and 12 have a spiral spring between them, tending to make them approach each other. This mechanism is so arranged that as rock-lever 10 raises gate 9 and releases a tack the spring raises gate 12, which catches the tack and delivers it into mouth of tack-chute. At the same instant almost gate 9 snaps down on a succeeding tack and holds for a repetition of above movements. (See Figs. 1 and 5.) The jarring motion of the driver effectually jars off the tack from the extreme end of the raceway. By the use of this automatic tack-feeder I dispense with the small boy needed to feed tacks singly by hand, as required in my above-referred-to application.

In operating my machine the operator stands facing the side of the machine shown in Fig. 3. Taking a last, he applies the insole. He also applies the upper, which is bent over at the toe, and drives the center toe-tack, either by hand, as usual, or by the machine; or a number of lasts may thus be previously made ready for the operator. The last is then so held by the operator that the gripper I rests on the inner sole, snug up to and under the edge of the upper. At this instant the operator lifts up the last, so as to force the insole against the spear B. The last's edge farthest from the operator rests against a back gage, 15, which can be adjustable, and can swing out of the way, as clearly shown in the drawings. The object of this back gage is to regulate the position of the last while the lasting is being done. One part of the back gage is secured by two screw-bolts passing through slots to the frame A, thus admitting of back-and-forth adjustment. That part of the back gage which "stops" the shoe or last has its rear end hinged to the front end of that part which is bolted to the frame. The front end can thus be swung out of the way on its hinge when desired, and can be locked in place by the flat catch-spring, as shown in drawings. The operator then presses on the treadle and starts the machine. The gripper J moves up to gripper I, firmly grasping the edge of the upper. As the two grippers holding the upper move still farther they are resisted by the holdfast B, so that the upper is forcibly pulled over the insole and last, and is held in position until the tack-passage $x$ of gripper J is in line with the driver K. At that instant the driver descends and drives the tack. The holdfast is then lifted by its rock-lever out of the way, and the operator, keeping time with the machine, moves his last a proper distance for the next tack, and repeats the operation above described, turning the last as necessary until the shoe is wholly tacked around or lasted.

I claim as my invention—

1. In a lasting-machine, the spear B, provided with rock-lever for raising it out of way after each tack-driving, substantially as set forth.

2. The gripper-jaws I and J, operated by bar D, levers U and V, spring $e$, and cam X, for grasping and pulling over the upper, substantially as set forth.

3. The mechanism for grasping and pulling over the upper, in combination with the rocking holdfast B.

4. The automatic tack-feeding mechanism, composed of tack-hopper Q, with flukes 8, raceway R, gates 9 and 12, rock-lever 10, and cam 11, substantially as set forth.

5. The mechanism for stopping tacks in the raceway one at a time and delivering them singly into the tack-chute, substantially as set forth.

6. The adjustable swinging back gage, 15, in combination with a pair of gripper-jaws, all constructed and arranged substantially as set forth.

7. In a lasting-machine, the mechanism for starting and stopping the machine, consisting of the toothed lever V, treadle-lever Y, stop-clutch 6, spring 4, rod 5, and a treadle, constructed and operating substantially as set forth.

JACOB R. SCOTT.

Witnesses:
J. C. CLAYTON,
JAMES P. DOLAN.